US012060967B2

(12) United States Patent
Bei et al.

(10) Patent No.: US 12,060,967 B2
(45) Date of Patent: Aug. 13, 2024

(54) LOCKING DEVICE, GIMBAL AND GIMBAL SYSTEM

(71) Applicant: SZ DJI TECHNOLOGY CO., LTD., Shenzhen (CN)

(72) Inventors: Shimeng Bei, Shenzhen (CN); Jian Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 385 days.

(21) Appl. No.: 17/388,622

(22) Filed: Jul. 29, 2021

(65) Prior Publication Data

US 2021/0356070 A1 Nov. 18, 2021

Related U.S. Application Data

(63) Continuation of application No. PCT/CN2019/073960, filed on Jan. 30, 2019.

(51) Int. Cl.
*F16M 11/04* (2006.01)
*F16M 11/12* (2006.01)
(Continued)

(52) U.S. Cl.
CPC ......... *F16M 11/123* (2013.01); *F16M 11/041* (2013.01); *F16M 11/048* (2013.01);
(Continued)

(58) Field of Classification Search
CPC .. G03B 17/561; F16M 11/123; F16M 11/041; F16M 11/048; F16M 11/16
See application file for complete search history.

(56) References Cited

U.S. PATENT DOCUMENTS 399,345 A 3/1889 Poehlman
2018/0023755 A1 1/2018 Ahearn et al.

FOREIGN PATENT DOCUMENTS

CN 201765421 U 3/2011
CN 202939404 U 5/2013
(Continued)

OTHER PUBLICATIONS

The World Intellectual Property Organization (WIPO) International Search Report for PCT/CN2019/073960 May 31, 2019 4 pages (translation included).

*Primary Examiner* — Christopher E Mahoney
(74) *Attorney, Agent, or Firm* — ANOVA LAW GROUP, PLLC

(57) ABSTRACT

A gimbal system, a gimbal and a locking device are provided. The locking device is configured to be disposed on the shaft arm. The locking device includes an upper cover, a lower cover, a quick release plate and a locking assembly. The upper cover is disposed on the shaft arm. The lower cover is disposed on the side of the shaft arm opposite to the upper cover, and the upper cover and the lower cover can move together along the first direction. The quick release plate is used to install a load. The quick release plate is disposed on the side of the upper cover away from the lower cover. The quick release plate can move along a second direction on the upper cover. The locking assembly passes through the lower cover and the upper cover. When the locking assembly is tightened, the upper cover and the lower cover are locked and fixed to the shaft arm, and the quick release plate and the upper cover are locked and fixed on the upper cover.

20 Claims, 10 Drawing Sheets

(51) Int. Cl.
 *F16M 11/16* (2006.01)
 *G03B 17/56* (2021.01)
(52) U.S. Cl.
 CPC ........... *F16M 11/16* (2013.01); *G03B 17/561* (2013.01); *F16M 2200/028* (2013.01)

(56) References Cited

FOREIGN PATENT DOCUMENTS

| | | | | | |
|---|---|---|---|---|---|
| CN | 104981644 | A | | 10/2015 | |
| CN | 106337997 | A | | 1/2017 | |
| CN | 107120499 | A | | 9/2017 | |
| CN | 206723742 | U | | 12/2017 | |
| CN | 109506093 | A | * | 3/2019 | ........... F16M 11/041 |
| CN | 209484197 | U | | 10/2019 | |
| EP | 3076065 | A1 | | 10/2016 | |
| KR | 200486914 | Y1 | * | 7/2018 | |
| TW | 201108246 | A | | 3/2011 | |
| WO | WO-2018119803 | A1 | * | 7/2018 | ........... F16M 11/045 |

\* cited by examiner

LOCKING DEVICE, GIMBAL AND GIMBAL SYSTEM

CROSS-REFERENCE TO RELATED APPLICATION

This application is a continuation of International Application No. PCT/CN2019/073960, filed Jan. 30, 2019, the entire content of which is incorporated herein by reference.

TECHNICAL FIELD

The present disclosure generally relates to the field of photography equipment technology and, more particularly, relates to a locking device, a gimbal, and a gimbal system.

BACKGROUND

A gimbal is a supporting workbench used to install a video camera. By adjusting the gimbal, the lens of the video camera can be adjusted to achieve the correct shooting of a target. The existing gimbal can be compatible with many different types of cameras or lenses, and the balance of each axis of the gimbal can be adjusted. However, since the existing gimbal needs to adjust multiple balance adjustment structures on the gimbal to make the video camera at a balanced state when the video camera is installed. Thus, the installation of the video camera is relatively complex.

SUMMARY

One aspect of present disclosure provides a locking device loaded on a gimbal. The locking device is disposed on the shaft arm of the gimbal and includes an upper cover, a lower cover, a quick release plate and a locking assembly. The upper cover is disposed on the shaft arm. The lower cover is disposed on a side of the shaft arm opposite to the upper cover. The upper cover and the lower cover are configured to move together along a first direction. The quick release plate is used to install a load. The quick release plate is disposed on a side of the upper cover away from the lower cover, and the quick release plate is configured to move along a second direction on the upper cover. The locking device passes through the lower cover and the upper cover. When the locking device is tightened, the upper cover and the lower cover are locked and fixed on the shaft arm, and the quick release plate is locked with the upper cover and fixed on the upper cover.

Another aspect of the present disclosure provides a gimbal including a shaft arm and a locking device disposed on the shaft arm of the gimbal. The locking device includes an upper cover, a lower cover, a quick release plate and a locking assembly. The upper cover is disposed on the shaft arm. The lower cover is disposed on a side of the shaft arm opposite to the upper cover. The upper cover and the lower cover are configured to move together along a first direction. The quick release plate is used to install a load. The quick release plate is disposed on a side of the upper cover away from the lower cover, and the quick release plate is configured to move along a second direction on the upper cover. The locking device passes through the lower cover and the upper cover. When the locking device is tightened, the upper cover and the lower cover are locked and fixed on the shaft arm, and the quick release plate is locked with the upper cover and fixed on the upper cover.

Another aspect of the present disclosure provides a gimbal system including a gimbal and an imaging device. The gimbal includes a shaft arm and a locking device disposed on the shaft arm of the gimbal. The locking device includes an upper cover, a lower cover, a quick release plate and a locking assembly. The upper cover is disposed on the shaft arm. The lower cover is disposed on a side of the shaft arm opposite to the upper cover. The upper cover and the lower cover are configured to move together along a first direction. The quick release plate is used to install a load. The quick release plate is disposed on a side of the upper cover away from the lower cover, and the quick release plate is configured to move along a second direction on the upper cover. The locking device passes through the lower cover and the upper cover. When the locking device is tightened, the upper cover and the lower cover are locked and fixed on the shaft arm, and the quick release plate is locked with the upper cover and fixed on the upper cover. Further, the imaging device is disposed on the quick release plate.

The additional aspects and advantages of the embodiments of the present disclosure will be partly given in the following description, and portions of them will become obvious from the following description, or will be understood through the practice of the embodiments of the present disclosure.

BRIEF DESCRIPTION OF THE DRAWINGS

The above and/or additional aspects and advantages of this disclosure will become obvious and easy to understand from the description of the embodiments in conjunction with the following drawings, in which.

DETAILED DESCRIPTION OF THE EMBODIMENTS

Figure 1:
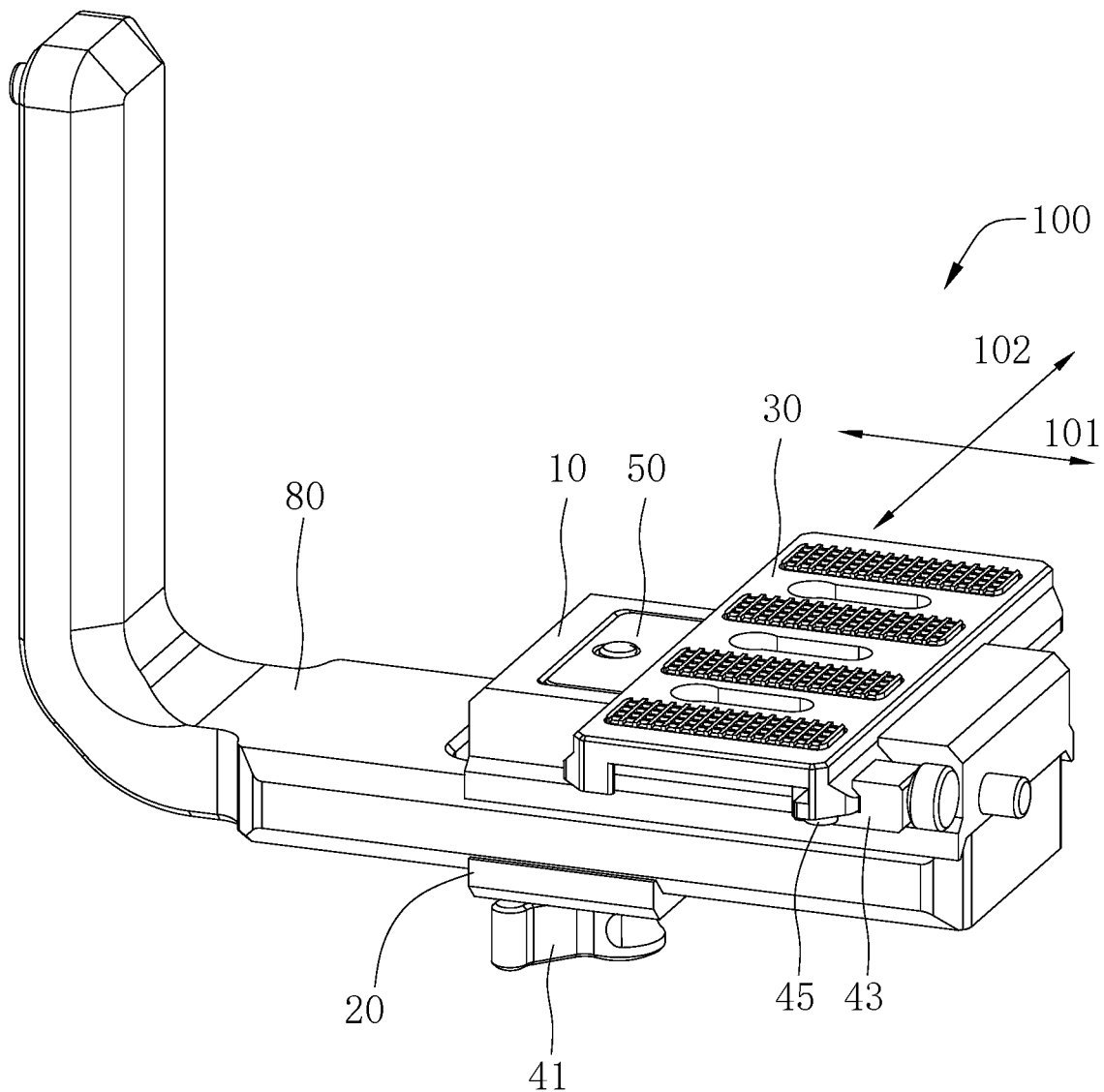
FIG. 1 is a schematic diagram of a three-dimensional structure of a gimbal according to some embodiments of the present disclosure.

The embodiments of the present disclosure are described in detail below. Examples of the embodiments are shown in the accompanying drawings, wherein the same or similar reference numerals represent the same or similar elements or elements with the same or similar functions. The following embodiments described with reference to the drawings are exemplary, and are only used to explain the present disclosure, and cannot be understood as a limitation to the present application.

In the description of this disclosure, it should be understood that the directional or positional relationship indicated by the term "center", "longitudinal", "transverse", "length", "width", "thickness", "upper", "lower", "front", "back", "left", "right", "vertical", "horizontal", "top", "bottom", "inner", "outer", "clockwise", "counterclockwise" and other is based on the orientational or positional relationship shown in the drawings, and is only for the convenience of describing the disclosure and simplifying the description, and does not indicate or imply that the device or element referred to must have a specific orientation, to be constructed and operated in a specific orientation. Therefore, it cannot be understood as a restriction on this disclosure. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "plurality" means two or more than two, unless otherwise specifically defined.

In the description of this disclosure, it should be noted that, unless otherwise clearly specified and limited, the terms "installation", "contact" and "connection" should be understood in a broad sense, for example, it can be a fixed connection or a detachable connection, or integral connection. It can be a direct connection or indirect connection through an intermediate medium, and it can be an internal through connection between two elements or the interaction between two elements. For those of ordinary skill in the art, the specific meanings of the above terms in this disclosure can be understood according to specific circumstances.

In this disclosure, unless expressly stipulated and defined otherwise, that a first feature is "above" or "below" a second feature may include a direct contact between the first feature and the second feature or may include that the first feature and the second feature do not contact directly but contact through other features between them. Further, that the first feature is "above", "over" and "on" the second feature may include the first feature being directly above and obliquely above the second feature, or it may simply mean that the level of the first feature is higher than that of the second feature. That the first feature is "below", "under", and "beneath of" the second feature may include the first feature being directly below and obliquely below the second feature, or it may simply mean that the level of the first feature is smaller than that of the second feature.

The followings provide many different embodiments or examples for realizing different structures of the present disclosure. To simplify the disclosure of the present application, the components and settings of specific examples are described below. Of course, they are only examples and are not intended to limit the disclosure. In addition, the present disclosure may repeat reference numbers and/or reference letters in different examples, and this repetition is for the purpose of simplification and clarity and does not indicate the relationship between the various embodiments and/or settings discussed.

As shown in FIG. 1, the locking device 100 loaded on a gimbal of the present disclosure may be configured to be disposed on the shaft arm 80 of the gimbal 200. The locking device 100 may include an upper cover 10, a lower cover 20, a quick release plate 30 and a locking assembly 41. The upper cover 10 may be configured to be disposed on the shaft arm 80. The lower cover 20 may be configured to be disposed on the side of the shaft arm 80 opposing the upper cover 10. The upper cover 10 and the lower cover 20 may be configured to move along a first direction 101 together. The quick release plate 30 may be configured to install loads. The quick release plate 30 may be disposed on a side of the upper cover 10 away from the lower cover 20. The quick release plate 30 may move along a second direction 102 on the upper cover 10. The locking assembly 41 may pass through the lower cover 20 and the upper cover 10. When the locking assembly 41 is tightened, the upper cover 10 and the lower cover 20 may be locked and fixed on the shaft arm 80, and the quick release plate 30 may be tightly locked with the upper cover 10 and fixed on the upper cover 10.

It can be understood that the first direction 101 may include two opposite directions, and the second direction 102 may also include two opposite directions. The first direction 101 and the second direction 102 may have an angle. In particular, the angle between the first direction 101 and the second direction 102 may be an acute angle, a right angle, or an obtuse angle. In one embodiment, the angle between the first direction 101 and the second direction 102 is a right angle. When the locking assembly 41 is tightened, the upper cover 10 can be elastically deformed and the quick release plate 30 may be pressed against the upper cover 10.

The locking device 100 of the present disclosure may be configured to fix the upper cover 10, the lower cover 20, and the quick release plate 30 at the same time through one locking operation of the locking assembly 41 to fix the load (for example, the imaging device 301 shown in FIG. 11) on the shaft arm 80 of the gimbal 200. Thus, the locking device 100 may simplify the installation of the load, and improve the installation efficiency of the load.

Further, referring to FIG. 1, the gimbal 200 of the present disclosure may include a shaft arm 80 and a locking device 100 installed on the shaft arm 80. The gimbal 200 may be a single-axis gimbal, two-axis gimbal, or a three-axis gimbal.

Figure 2:
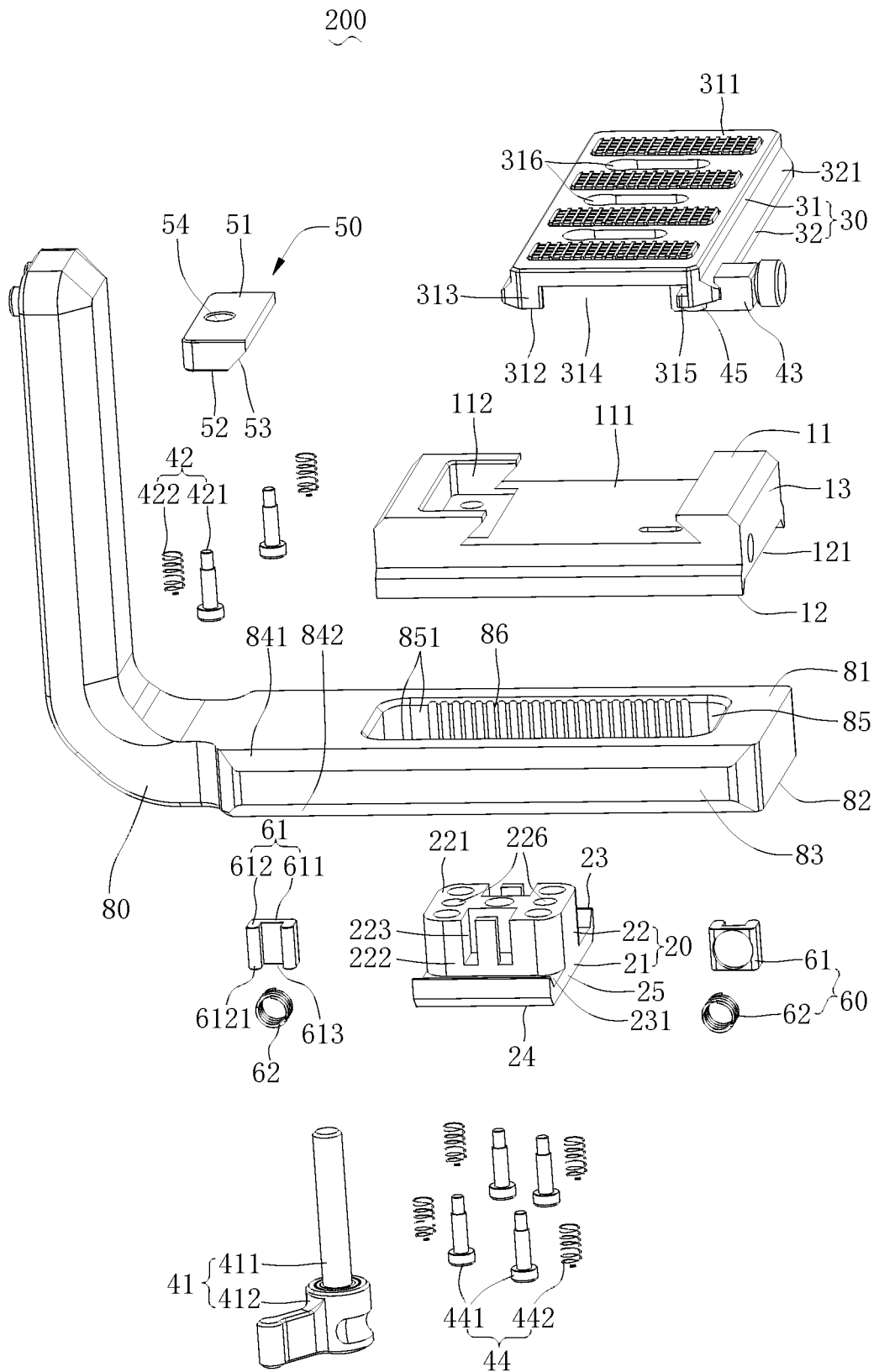
FIG. 2 is a three-dimensional exploded schematic diagram of a gimbal according to some embodiments of the present disclosure.
Figure 3:
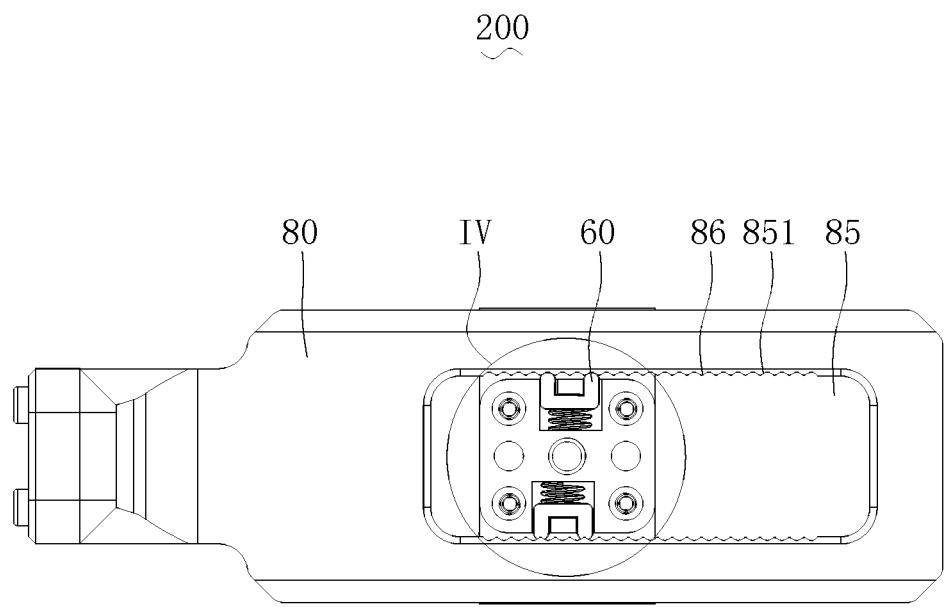
FIG. 3 is a schematic diagram of a three-dimensional structure of some components of a gimbal according to some embodiments of the present disclosure.
Figure 4:
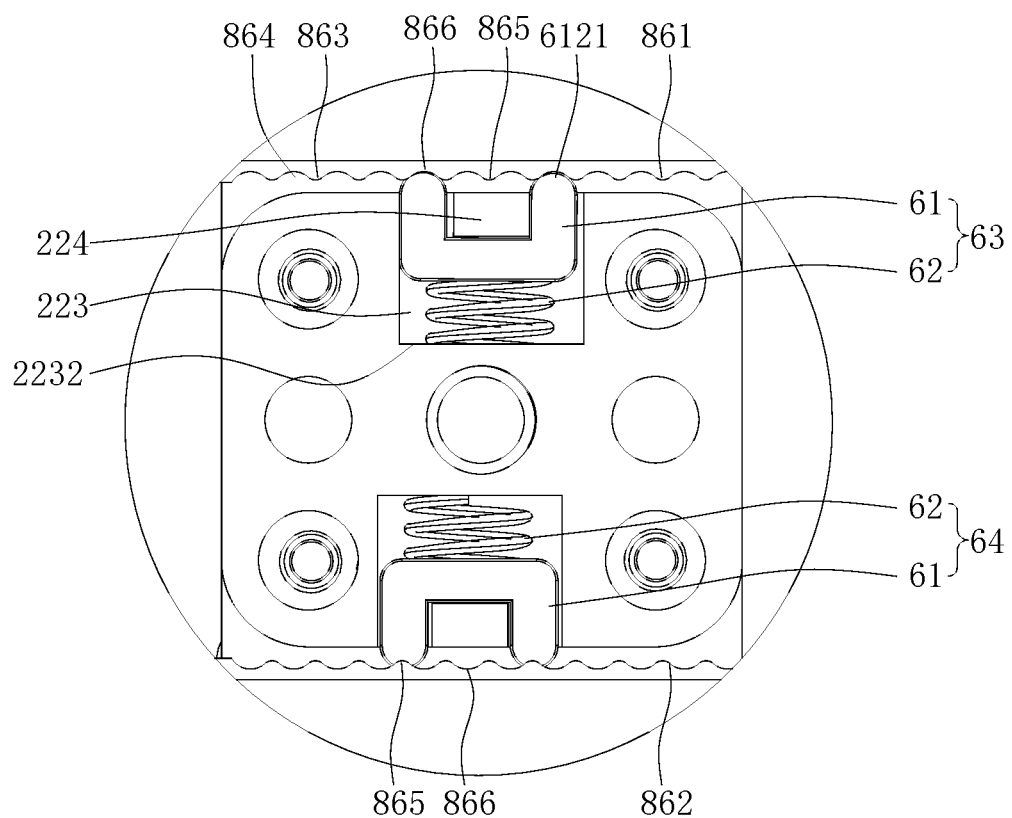
FIG. 4 is a partially enlarged schematic diagram of the position IV in FIG. 3.

As shown in in FIGS. 2-4, the shaft arm 80 may include a shaft arm top wall 81, a shaft arm bottom wall 82 and a shaft arm side wall 83. The shaft arm top wall 81 and the shaft arm bottom wall 82 may be located on opposite sides of the shaft arm 80. The shaft arm side wall 83 may connect the shaft arm top wall 81 and the shaft arm bottom wall 82. An upper chamfer 841 may be formed at the joint of the shaft arm side wall 82 and the shaft arm top wall 81, and a lower chamfer 842 may be formed at the joint of the shaft arm side wall 82 and the shaft arm bottom wall 82. The shaft arm 80 may be provided with a through groove 85 passing through the shaft arm top wall 81 and the shaft arm bottom wall 82. The through groove 85 may include two mutually parallel and opposite inner side walls 851, the inner side walls 851 may be parallel to the extending direction of the shaft arm 80, and the extending direction of the shaft arm 80 may be defined as the first direction 101. The through groove 85 of this embodiment is a rectangular groove, and the inner side wall 851 may corresponds to the long side of the rectangular groove. In other embodiments, the through groove 85 may also have a racetrack shape. Wave teeth 86 may be formed on the two inner side walls 851. One of the inner side walls 851 may be provided with a first wave tooth 861, and the other inner side wall 851 may be provided with a second wave tooth 862. The wave teeth 86 may include a plurality of teeth 863 arranged at equal intervals, and one tooth groove 864 may formed between two adjacent teeth 863.

The outer contour of the tooth 863 may be a sine curve or an arc. In this embodiment, the tooth top 865 of the first wave tooth 861 may be opposite to the tooth top 865 of the second wave tooth 862, and the tooth bottom 866 of the first wave tooth 861 may be opposite to the tooth bottom 866 of the second wave tooth 862. In other embodiments, the tooth top 865 of the first wave tooth 861 may be opposite to the tooth bottom 866 of the second wave tooth 862, and the tooth bottom 866 of the first wave tooth 861 may be opposite to the tooth top 865 of the second wave tooth 862.

Referring to FIG. 1 and FIG. 2, the locking device 100 of the present disclosure may include the upper cover 10, the lower cover 20, the quick release plate 30, the locking assembly 41, an anti-off assembly 42, a position limiting assembly 43, a position limiting screw 45, and a fixing assembly 44, a press block 50 and a pre-tightened assembly 60.

The upper cover 10 may include an upper cover top 11, an upper cover bottom 12, and an upper cover side wall 13. The upper cover top 11 and the upper cover bottom 12 may be located at opposite sides of the upper cover 10, and the upper cover side wall 13 may be connected to the upper cover top 11 and the upper cover bottom 12 and surround the upper cover top 11 and the upper cover bottom 12. The upper cover bottom surface 12 may be provided with an upper cover mounting groove 121, and the upper cover mounting groove 121 may pass through the two upper cover side walls 13 along the first direction 101. A cross section of the upper cover mounting groove 121 crossed by a plane perpendicular to the first direction 101 may be trapezoidal. When the upper cover 10 is installed on the shaft arm 80, the shaft arm top wall 81 may be held in the upper cover mounting groove 121, the bottom surface of the upper cover mounting groove 121 abuts the shaft arm top wall 81, and the side surface of the upper cover mounting groove 121 abuts the chamfer 841. The upper cover top 11 may be is provided with a sliding groove 111 and a receiving groove 112. The sliding groove 111 may pass through two opposite upper cover side walls 13, and the receiving groove 112 abuts the sliding groove 111 and may be located on one side of the sliding groove 111. One of the extending directions of the sliding groove 111 (the direction connecting the centers of the two upper cover side walls 13) may be defined as the second direction 102, and the second direction 102 may form an angle with the first direction 101. The angle may be an acute angle, right angle, or obtuse angle. The angle between the first direction 101 and the second direction 102 in this embodiment is a right angle. In particular, the first direction 101 and the second direction 102 may be perpendicular to each other. The sliding groove 111 may be a dovetail groove. The bottom of the receiving groove 112 may be provided with an upper cover step hole 113 passing through the upper cover 10 (referring to FIG. 6 and FIG. 8). The upper cover 10 may also include an upper cover positioning pillar 14 protruding from the bottom surface of the sliding groove 111 (referring to FIG. 7). In other embodiments, the bottom surface of the sliding groove 111 may also be provided with an upper cover positioning hole (not shown).

Figure 5:
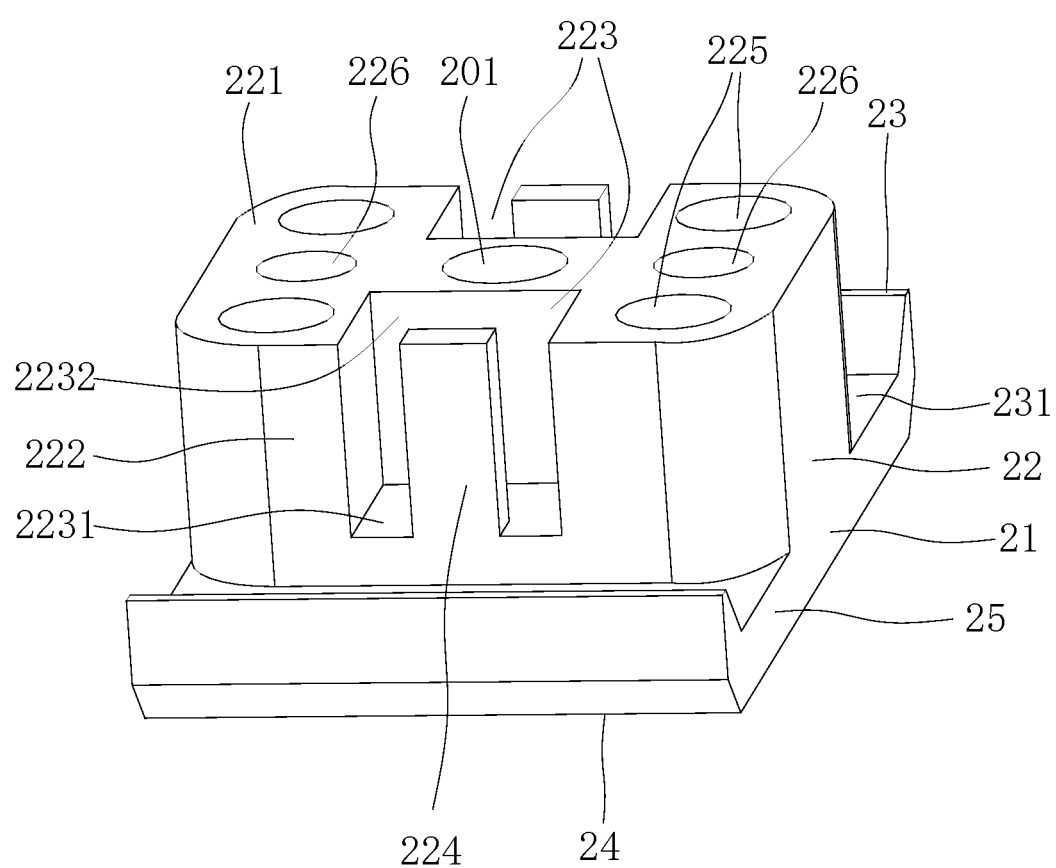
FIG. 5 is a three-dimensional structural diagram of the lower cover of the locking device in some embodiments of the present disclosure.

Referring to FIG. 5, the lower cover 20 may include a lower cover body 21 and a lower cover hump 22 that are connected. The lower cover body 21 may include a lower cover top 23, a lower cover bottom 24 and a lower cover side wall 25. The lower cover top 23 and the lower cover bottom 24 may be located on opposite sides of the lower cover body 21. The lower cover side wall 25 may be connected to the lower cover top 23 and the lower cover bottom 24 and may surround the lower cover top surface 23 and the lower cover bottom surface 24. The lower cover top surface 23 may be provided with a lower cover mounting groove 231, and the lower cover mounting groove 231 may pass through the two lower cover side surfaces 25 of the lower cover body 21 along the first direction 101. The cross-section of the lower cover mounting groove 231 sectioned by a plane perpendicular to the first direction 101 may be trapezoidal. When the lower cover 20 is mounted on the shaft arm 80, the shaft arm bottom wall 82 may be received in the lower cover mounting groove 231, the bottom surface of the lower cover mounting groove 231 abuts the shaft arm bottom wall 82, and the side surface of the lower cover mounting groove 231 abuts the chamfer 842.

The lower cover hump 22 may be formed by extending from the bottom surface of the lower cover mounting groove 231. The lower cover hump 22 may be received in the through groove 85. The lower cover hump 22 may include a hump top surface 221 and a hump side surface 222. The hump top surface 221 may be located on the side of the lower cover hump 22 away from the lower cover body 21. The hump side surface 222 may be connected with the hump top surface 221 and the bottom surface of the lower cover mounting groove 231. The hump side surface 222 may be opposite to the inner sidewall 851. The hump top surface 221 may be provided with two receiving grooves 223 respectively passing through the two hump side surfaces 222. The receiving groove 223 may include a receiving groove bottom surface 2231 and a receiving groove side surface 2232. The receiving groove bottom surface 2231 may be located on a side of the receiving groove 223 away from the hump top surface 221. The receiving groove side surface 2232 may be parallel to the hump side surface 222 and may be concaved relative to the hump side surface 222. The lower cover hump 22 may include a position limiting bump 224 extending from the receiving groove bottom surface 2231, and the position limiting bump 224 may be opposed to the receiving groove side surface 2232 at intervals. The number of the receiving grooves 223 in this embodiment may be two, and the positions of the two receiving grooves 223 along the first direction 101 may be slightly shifted. The hump top surface 221 may be provided with a lower cover step hole 225 (referring to FIG. 7) and a lower cover positioning hole 226. The lower cover step hole 225 may pass through the lower cover hump 22 and the lower cover body 21. The lower cover positioning hole 226 may be a blind hole or a through hole. When the lower cover 20 is installed on the shaft arm 80, the upper cover positioning pillar 14 may be inserted into the lower cover positioning hole 226. In other embodiments, the lower cover top surface 221 may protrude to form a lower cover positioning pillar (not shown in the figure). When the lower cover 20 is installed on the shaft arm 80, the lower cover positioning pillar may be inserted into the upper cover positioning hole.

Figure 6:
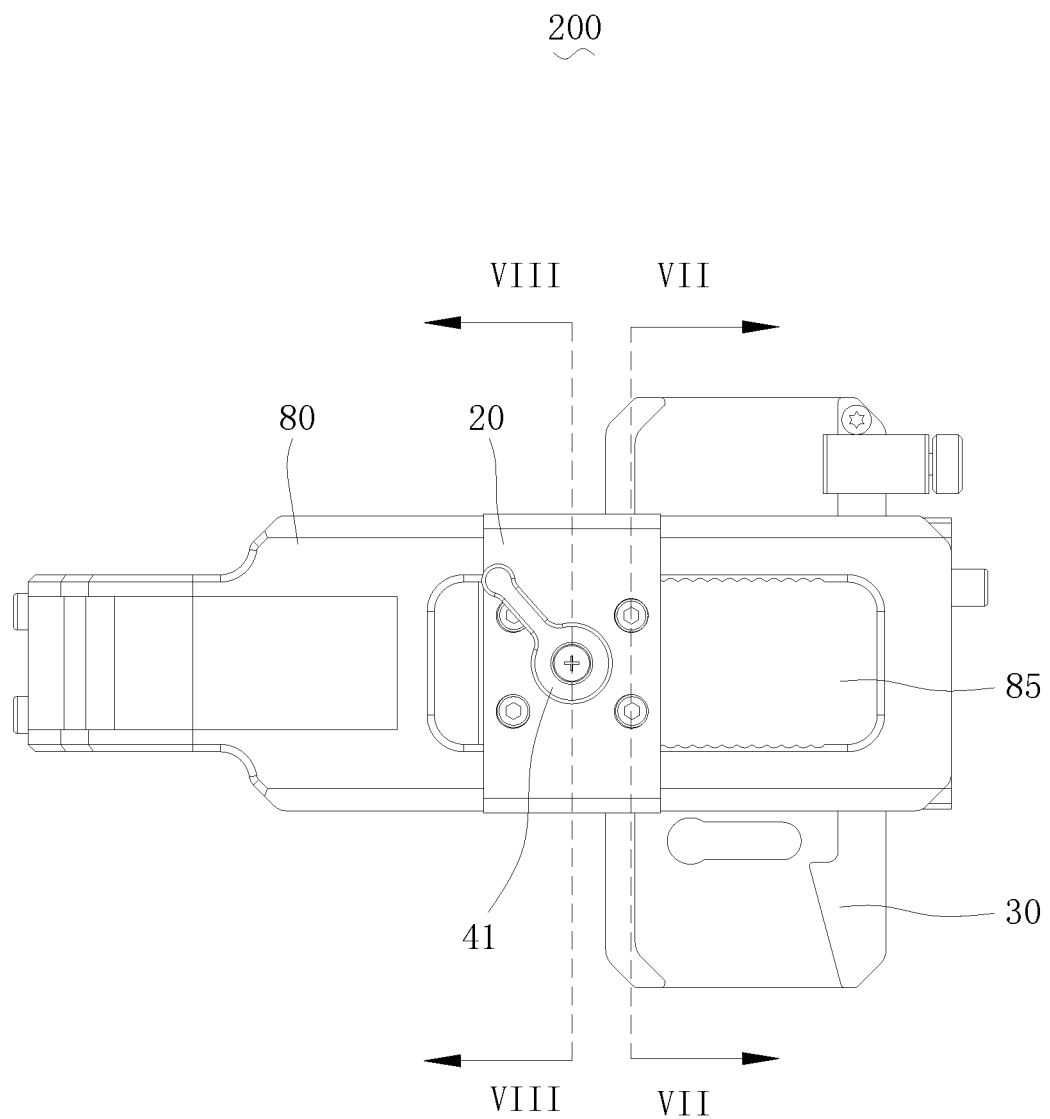
FIG. 6 is a schematic diagram of a three-dimensional structure of a gimbal according to some embodiments of the present disclosure.
Figure 7:
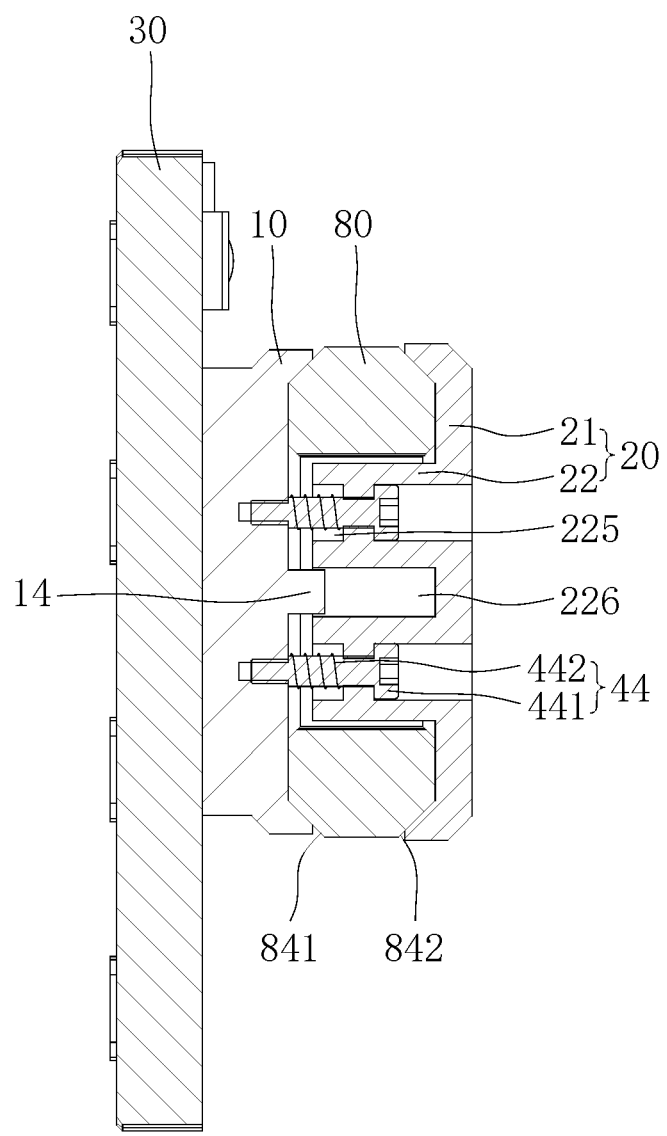
FIG. 7 is a schematic cross-sectional view of the gimbal in FIG. 6 along the line VII-VII.

Please refer to FIGS. 6-7, the fixing assembly 44 may include a fixing screw 441 and a press spring 442. The fixing screw 441 may pass through the lower cover step hole 225, and may be combined with the upper cover 10. The press spring 442 may be received in the lower cover step hole 225 and may be located between the upper cover 10 and the lower cover 20, and the press spring 442 may also be sleeved outside the fixing screw 441.

Referring to FIG. 2, the quick release plate 30 may include a quick release body 31 and two quick release bumps 32. The quick release body 31 may include a quick release top wall 311, a quick release bottom wall 312, and a quick release side wall 313. The quick release top wall 311 and the quick release bottom wall 312 may be located at opposite sides of the quick release body 31, and the quick release side wall 313 may be connected with the quick release top wall 311 and the quick release bottom wall 312. The quick release bottom wall 312 may be provided with a groove 314, and the quick release side wall 313 may surround the groove 314. The groove 314 in this embodiment may pass through the two quick release side walls 313 along the second direction 102. The surface of the quick release side wall 313 surrounding the groove 314 may be provided with a clamping slot 315, and the extending direction of the clamping slot 315 may be parallel to the second direction 102. The two quick release bumps 32 may respectively extend from two opposite quick release side walls 313. In particular, the quick release bumps 32 may extend outward from the surface of the quick release sidewall 313 opposite to the clamping slot 315, and the extending direction of the quick release bump 32 may be perpendicular to the second direction 102. The quick release bump 32 may include a bump top surface 321 away from the quick release bottom wall 312. Along the direction in which the quick release bump 32 extends outward from the quick release side wall 313, the bump top surface 321 may be inclined toward the quick release bottom wall 312. When the quick release plate 30 is installed on the upper cover 10, the quick release body 31 and the two quick release bumps 32 may be both received in the sliding groove 111, and at this time, the quick release bottom wall 312 may be opposed to the bottom surface of the sliding groove 111, and may abut the sliding groove 111. The bump top surface 321 may abut the side surface of the sliding groove 111.

The position limiting assembly 43 may be detachably disposed on the quick release side wall 313 and the quick release bump 32, and may be partially clamped in the clamping slot 315. The position limiting screw 45 may be detachably disposed on the quick release side wall 313. When the position limiting assembly 43 and the position limiting screw 45 are both disposed on the quick release plate 30, the quick release plate 30 may be installed on the upper cover 10, and the position limiting screw 45 and the upper cover 10 may be respectively located on opposite sides of the position limiting assembly 43. The position limiting assembly 43 and the position limiting screw 45 may limit the movement stroke of the quick release plate 30 along the second direction 102.

Figure 9:
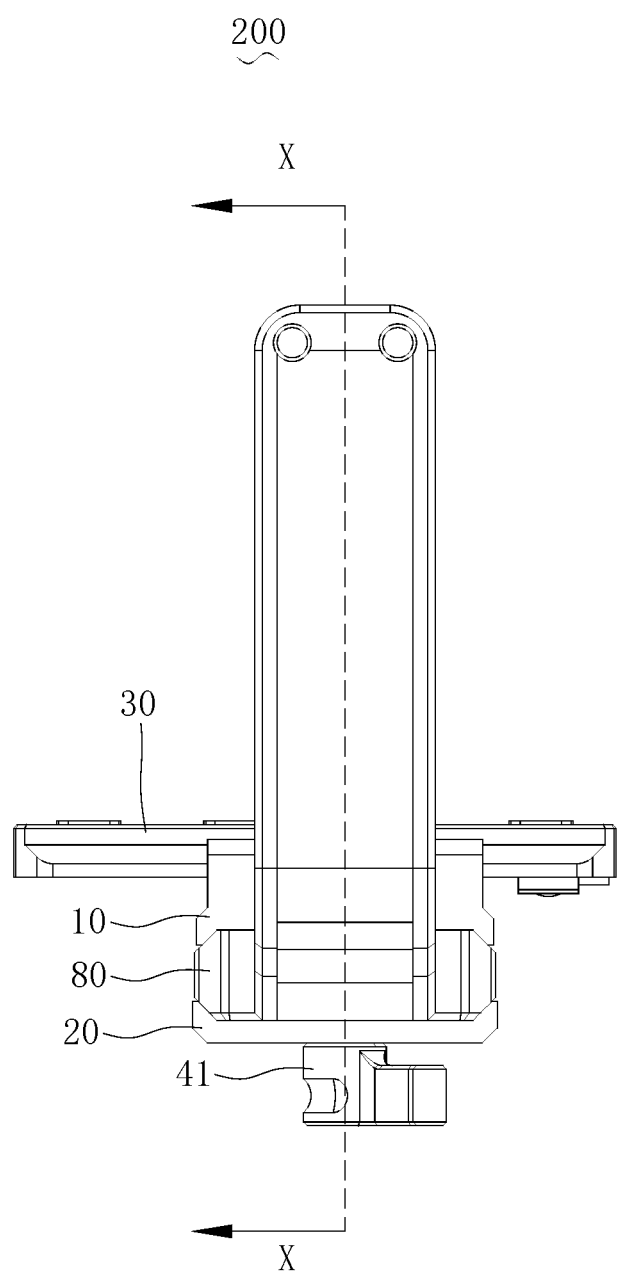
FIG. 9 is a schematic diagram of a three-dimensional structure of a gimbal according to some embodiments of the present disclosure.
Figure 10:
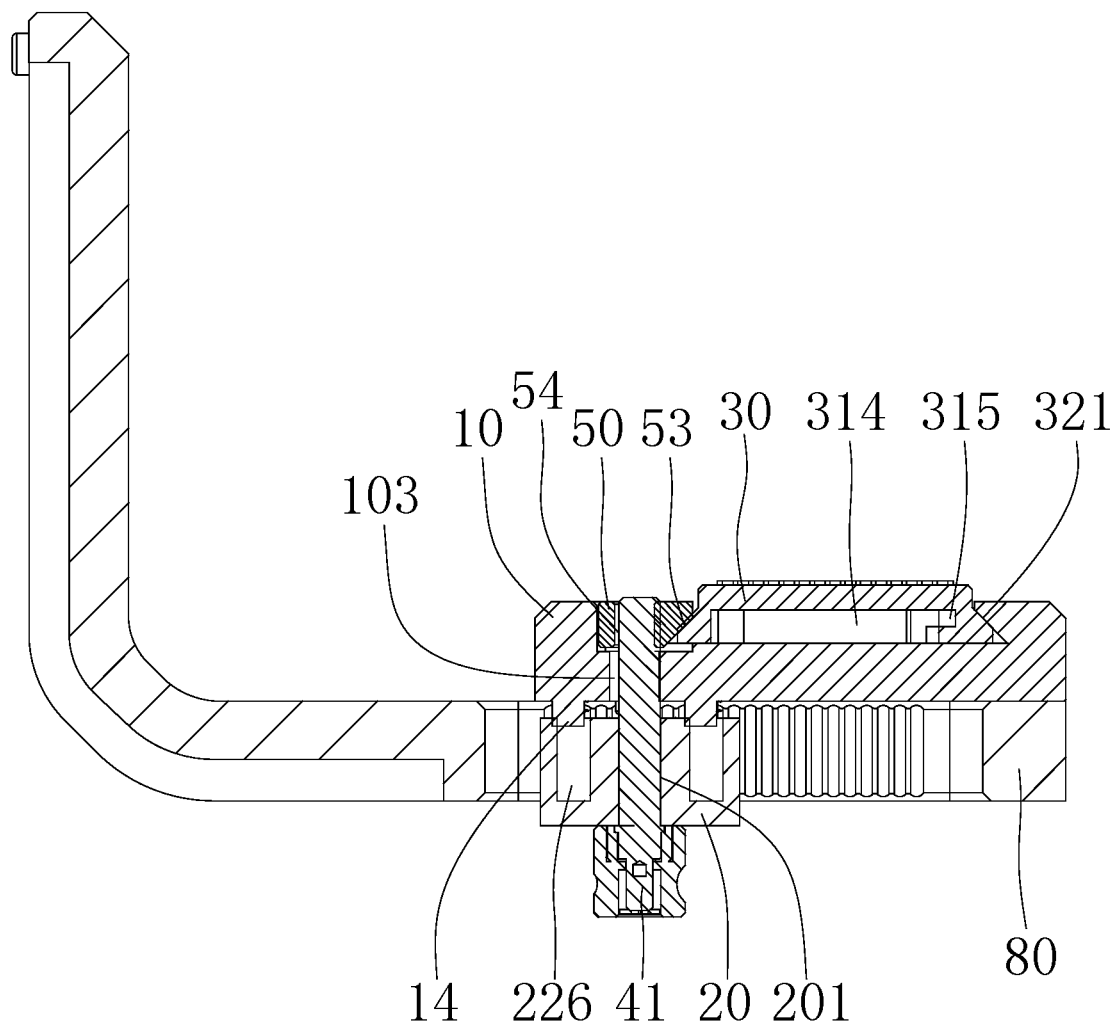
FIG. 10 is a schematic cross-sectional view of the gimbal in FIG. 9 along the line X-X and FIG. 11 is a schematic structural diagram of a gimbal system according to some embodiments of the present disclosure.

Referring to FIG. 2, FIG. 9 and FIG. 10, the press block 50 may include a press block top surface 51, a press block bottom surface 52 and a press block side surface 53. The press block top surface 51 and the press block bottom surface 52 may be located two opposite sides of the press block 50. The press block side surface 53 may be connected to the press block bottom surface 52 and may be inclined relative to the press block bottom surface 52. In this embodiment, the cross section of the press block 50 crossed by a plane perpendicular to the press block bottom surface 52 and the press block side surface 53 may be a pentagon. The pentagon may be obtained by chamfering one of the corners of a rectangle. The press block side surface 53 may correspond to the chamfered corner. In other embodiments, the cross section of the press block 50 sectioned by a plane perpendicular to the press block bottom surface 52 and the press block side surface 53 may be a right-angled trapezoid. The press block bottom surface 52 may correspond to the upper bottom side and the press block side surface 53 may correspond to the waist inclined with the upper side. The press block 50 may be received in the receiving groove 112 and may abut the quick release plate 30. For example, when the press block 50 is disposed on the quick release plate 30, the bottom surface 52 of the press block 50 may be disposed oppositely with the bottom surface of the receiving groove 112 and may abut the bottom surface of the receiving groove 112. The press block side surface 53 may abut the bump top surface 321.

Figure 8:
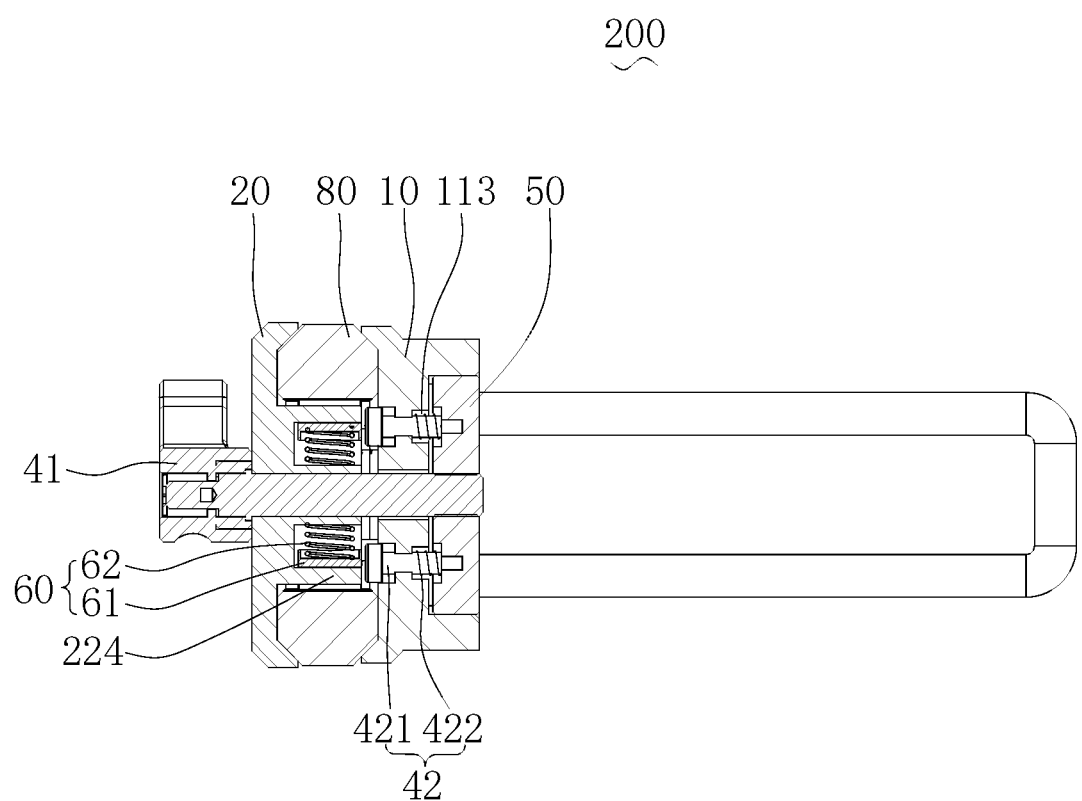
FIG. 8 is a schematic cross-sectional view of the gimbal in FIG. 6 along the line VIII-VIII.

Referring to FIG. 6 and FIG. 8, the anti-off component 42 may include an anti-off screw 421 and a press block spring 422. The anti-off screw 421 may be inserted into the upper cover step hole 113, and may be combined with the press block 50. The press block spring 422 may be held in the upper cover step hole 113, and may be located between the upper cover 10 and the press block 50. The press block spring 422 may be also sleeved outside the anti-off screw 421.

Referring to FIGS. 2 to 4, the pre-tightened assembly 60 may include a pre-tightened block 61 and a pre-tightened elastic member 62. The pre-tightened block 61 may include a pre-tightened body 611 and two resistance arms 612. The two resistance arms 612 may extend from two opposite ends of the pre-tightened body 611, and the pre-tightened body 611 and the two resistance arms 612 may jointly enclose a receiving cavity 613. The resistance arm 612 may include a resistance portion 6121 away from the pre-tightened body 611. The shape of the resistance portion 6121 may match the shape of the tooth groove 864. The outer peripheral surface of the resistance portion 6121 of this embodiment may be an arc surface. When the pre-tightened assembly 60 is installed on the lower cover 20, the pre-tightened block 61 may be received in the holding groove 223. The pre-tightened body 611 may be located between the receiving groove side surface 2232 and the position limiting bump 224, and the position limiting bump 224 may be received in the receiving cavity 613. The two resistance arms 612 may both extend from the receiving groove 223 to the outside of the hump side surface 222, and the resistance portion 6121 abuts the wave teeth 86. The pre-tightened elastic member 62 may be received in the receiving groove 223, and may be located between the pre-tightened body 611 and the receiving groove side surface 2232. For example, one end of the pre-tightened elastic member 62 may counteract with the pre-tightened body 611, and the other end of the pre-tightened elastic member 62 may counteract with the receiving groove side surface 2232.

The number of pre-tightened assemblies 60 in this embodiment is two, and the two pre-tightened assemblies 60 may be respectively installed in the two receiving grooves 223. The two pre-tightened assemblies 60 may include a first pre-tightened assembly 63 and a second pre-tightened assembly 64, respectively. Along the first direction 101, the two receiving grooves 223 may be slightly staggered such that the pre-tightened block 61 of the first pre-tightened assembly 63 and the pre-tightened block 61 of the second pre-tightened assembly 64 may be separated by a half tooth width (one half of the tooth width of the tooth 863). The first pre-tightened assembly 63 may abut the first wave tooth 861, and the second pre-tighten assembly 64 may abut the second wave tooth 862. The half tooth width of the tooth 863 in this embodiment may be 1 mm. In other embodiments, the half tooth width may also be 0.5 mm, 2 mm, or 4 mm. When the resistance portion 6121 of the first pre-tightened assembly 63 abuts the tooth bottom 866 of the first wave tooth 861, the resistance portion 6121 of the second pre-tightened assembly 64 abuts with the tooth top 865 of the second wave tooth 862. In other embodiments, when the tooth top 865 of the first wave tooth 861 is opposite to the tooth bottom 866 of the second wave tooth 862, and the tooth bottom 866 of the first wave tooth 861 is opposite to the tooth top 865 of the second wave tooth 862, the pre-tightened block 61 of the first pre-tightened assembly 63 and the pre-tightened block 61 of the second pre-tightened assembly 64 may be symmetrical about a plane of symmetry parallel to the two inner side walls 851. For example, the plane of symmetry may pass through the center of the lower cover hump 22 and parallel to the inner side walls 851. At this time, when the resistance portion 6121 of the first pre-tightened assembly 63 abuts the tooth bottom 866 of the first wave tooth 861, the resistance portion 6121 of the second pre-tighten assembly 64 abuts the second tooth top 865 of the second wave tooth 862.

The locking assembly 41 may include a locking column 411 and a handle 412. The handle 412 may be disposed at one end of the locking column 411. The locking column 411 may pass through the lower cover 10 and the upper cover 20 and may be combined with the press block 50. The handle 412 may be disposed at the end of the lower cover 20 away from the upper cover 10.

As shown in FIG. 10, in one embodiment, the upper cover 10 may be provided with an upper cover through-hole 103. The upper cover through-hole 103 may pass through the upper cover top surface 11 and the upper cover bottom surface 12 and may be in connection with the receiving groove 112. The lower cover 20 may be provided with a lower cover through hole 201. The lower cover through hole 201 may pass through the lower cover bottom surface 24 and the hump top surface 23. The bottom surface 52 of the press block 50 may be provided with a coupling hole 54 that may pass through the bottom surface 52 and the top surface of the press block 51. Alternatively, the coupling hole 54 may also be a blind hole.

Referring to FIG. 2 and FIG. 10, when the locking device 100 is installed on the shaft arm 80, the block body 31 and the quick release bump 32 may be both installed in the sliding groove 111 of the upper cover 10, and a portion of the quick release bump 32 may extend into the receiving groove 112. The press block 50 may be disposed on the quick release bump 32 such that the press block side surface 53 may abut the bump top surface 321, and the press block 50 may also be received in the receiving groove 112. The upper cover 10 may be disposed on the shaft arm 80. At this time, the shaft arm top wall 81 may be received in the upper cover mounting groove 121. The bottom surface of the upper cover mounting groove 121 may abut the shaft arm top wall 81, and the upper cover mounting groove 121 may abut the upper chamfer 841. The lower cover 20 may be disposed on the shaft arm 80. At this time, the shaft arm bottom wall 82 may be held in the lower cover mounting groove 231. The bottom surface of the lower cover mounting groove 231 may abut the shaft arm bottom wall 82, and the side surface of the lower cover mounting groove 231 may abut the chamfer 842. Further, the lower cover hump 22 may be received in the through groove 85, and the upper cover positioning column 14 may pass through the lower cover positioning hole 226 to realize the positioning and installation of the lower cover 20 on the upper cover 10. The end of the locking column 411 away from the handle 412 may sequentially pass through the lower cover through hole 201, the through groove 85, and the upper cover through-hole 103, and may be combined with the coupling hole 54. The quick release plate 30, the upper cover 10, the shaft arm 80 and the lower cover 20 may be located between the press block 50 and the handle 412. If the upper cover is provided with an upper cover positioning hole and the lower cover is provided with a lower cover positioning pillar, the lower cover positioning pillar may be inserted into the upper cover positioning hole to realize the positioning and installation of the lower cover 20 on the upper cover 10.

When the quick release plate 30, the upper cover 10 and the lower cover 20 need to be locked, the locking assembly 41, the quick release plate 30, the upper cover 10, the shaft arm 80 and the lower cover 20 may be tightly clamped on the press block 50 and handle 412. For example, the press block 50 may be pressed on the bump top surface 321 of the quick release plate 30 and the quick release plate 30 may be pressed on the upper cover 10. At this time, the quick release plate 30 may be fixed relative to the upper cover 10 and the quick release plate 30 may be unable to slide in in the sliding groove 111 along the second direction 102. The quick release plate 30 may be pressed on the upper cover 10 such that the upper cover 10 may be pressed on the shaft arm top wall 81 of the shaft arm 80. At this time, the upper cover 10 may be fixed relative to the shaft arm 80 and the upper cover 10 may be unable to slide in the shaft arm top wall 81 along the first direction 101. The handle 412 may tightly press the lower cover 20 against the shaft arm bottom wall 82 such that the lower cover 20 may be fixed relative to the shaft arm 80 and the lower cover 20 may be unable to slide on the shaft arm bottom wall 82 along the first direction 101.

When the locking device 100 needs to be adjusted, the locking assembly 41 may be loosened. At this time, the quick release plate 30 may slide in the sliding groove 111 along the second direction 102, and the upper cover 10 and the lower cover 20 may slide relative to the shaft arm 80 toward the first direction 101. For example, when the resistance portion 6121 of one of the pre-tightened components 60 abuts the tooth bottom 866, the pre-tightened assembly 60 and the wave teeth 86 may remain stationary. When neither of the resistance portions 6121 of the two pre-tightened components 60 abuts the tooth bottom 866, the pre-tightened assemblies 60 may slide relative to the wave tooth 86. When the upper cover 10 and the lower cover 20 need to move along the first direction 101, the upper cover 10 and the lower cover 20 may move a half tooth width (one half of the tooth width of the tooth 863) along the first direction 101 each time.

The locking direction of the locking device 100 of this embodiment may be perpendicular to the first direction 101, and the locking direction of the locking device 100 may also be perpendicular to the second direction 102. For example, the locking direction of the locking device 100 may be the moving direction of the press block 50 (or the upper cover 10) when the locking assembly 41 is tightened.

The gimbal 200 and the locking device 100 of this embodiment may be configured to simultaneously fix the upper cover 10, the lower cover 20, and the quick release plate 30 through a single locking operation on the locking assembly 41 such that the load (for example, the imaging device 301) may be fixed on the shaft arm 80 of the gimbal 200. Thus, the locking device 100 may simplify the installation of the load, and improve the installation efficiency of the load.

The gimbal 200 and the locking device 100 of the present disclosure may be provided with a press block 50 to facilitate the press of the quick release plate 30 in the sliding groove 111 by the press block 50. The upper cover 10 may be disposed with the upper cover mounting groove 121. When the upper cover 10 is disposed on the shaft arm 80, the shaft arm top wall 81 may be received in the upper cover mounting groove 121 to prevent the upper cover 10 from rotating relative to the shaft arm 80. The sliding groove 111 may be a dovetail groove. The quick release plate 30 may include two quick release bumps 32 and a bump top surface 321 inclined toward the quick release bottom wall 312. Therefore, when the press block 50 presses the quick release bump 32, the quick release plate 30 may slide toward the side away from the pressing block 50 and press the quick release bump 32 away from the press block 50 on the side surface of the sliding groove 111. The locking device 100 may be provided with an anti-off screw 421 such that, when the locking assembly 41 is loosened, the press block 50 may be prevented from falling off the upper cover 10 and the quick release plate 30. The locking device 100 may be provided with a press block spring 422. Thus, when the locking assembly 41 is loosened, the press block 50 may be prevented from shaking. The lower cover 20 may be provided with a lower cover mounting groove 231. When the lower cover 20 is disposed on the shaft arm 80, the shaft arm bottom wall 82 may be received in the lower cover mounting groove 231 to prevent the lower cover 20 from rotating relative to the shaft arm 80. The locking device 100 may be provided with a fixing screw 441 such that, when the locking assembly 41 is loosened, the lower cover 20 may be prevented from falling off from the upper cover 10. The locking device 100 may be provided with a press spring 442 such that, when the locking assembly 41 is loosened, the lower cover 20 may be prevented from shaking. The shaft arm 80 of the present disclosure may be provided with a through groove 85 to facilitate the connection between the lower cover 20 and the upper cover 10. When the resistance portion 6121 of the first pre-tightened assembly 63 abuts the tooth bottom 866 of the first wave tooth 861, the resistance portion 6121 of the second pre-tightened assembly 64 may be with the tooth top 865 of the second wave tooth 862. When the resistance portion 6121 of the pre-tightened assembly 63 contacts the tooth top 865 of the first wave tooth 861, the resistance portion 6121 of the second pre-tightened assembly 64 may abut the tooth bottom 866 of the second wave tooth 862. Accordingly, the upper cover 10 and the lower cover 20 may move a half tooth width each time; and the moving accuracy of the upper cover 10 and the lower cover 20 may be improved.

Figure 11:
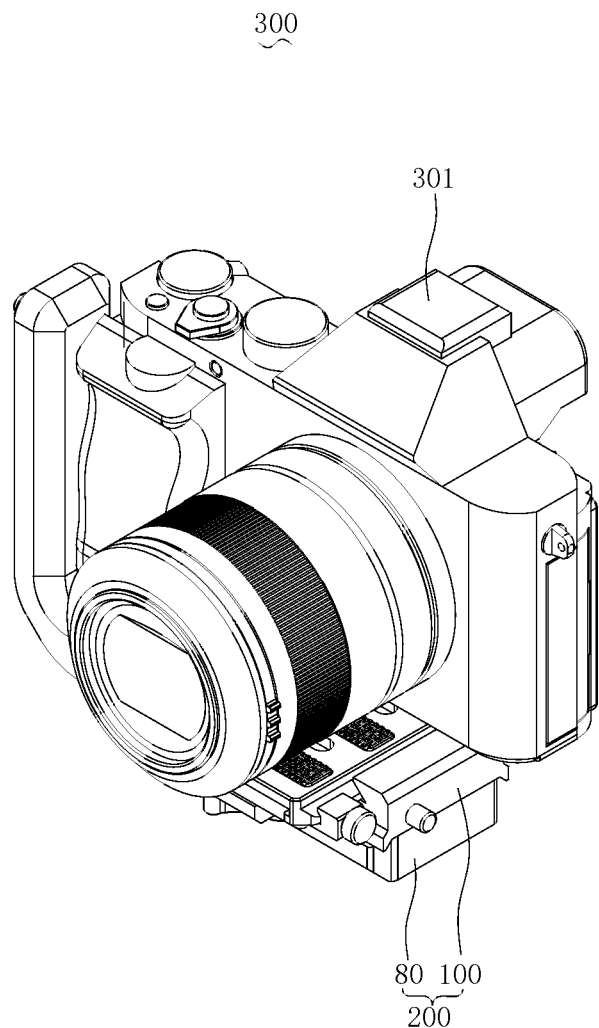

As shown in FIG. 11, the gimbal system 300 of the present disclosure may include the aforementioned gimbal 200 and an imaging device 301. The imaging device 301 may be installed on the quick release plate 30. For example, the quick release top wall 311 of the quick release plate 30 may be provided with a load installation groove 316, and the imaging device 301 may be installed on the quick release plate 30 through the load installation groove 316. The gimbal system 300 may include an unmanned aerial vehicle, an unmanned ship, an unmanned vehicle, and a handheld gimbal, etc.

The locking device 100 in the gimbal system 300 of this disclosure is configured to simultaneously fix the upper cover 10, the lower cover 20, and the quick release plate 30 by one locking operation of the locking assembly 41 such that the load (such as the imaging device 301) may be fixed on the shaft arm 80 of the gimbal 200. Thus, the locking device 100 may simplify the installation of the load, and the installation efficiency of the load may be improved.

In the description of this specification, reference made to the terms "certain embodiments", "one embodiment", "some embodiments", "exemplary embodiments", "examples", "specific examples", or "some examples", etc., may mean that the specific feature, structure, material or characteristic described in combination with the embodiments or examples may be included in at least one embodiment or example of the disclosure. In the present disclosure, the schematic representations of the above-mentioned terms do not necessarily refer to the same embodiment or example. Moreover, the described specific features, structures, materials, or characteristics can be combined in any one or more embodiments or examples in a suitable manner.

Although the embodiments of the present disclosure have been shown and described above, it can be understood that the above-mentioned embodiments are exemplary and should not be construed as limiting the present disclosure. A person of ordinary skill in the art can do changes, modifications, substitutions, and modifications to the above-described embodiments within the scope of the present disclosure, and the scope of the present disclosure is defined by the claims and their equivalents.

What is claimed is:

1. A locking device loaded on a gimbal, the locking device being disposed on a shaft arm of the gimbal and comprising:
    an upper cover disposed on the shaft arm;
    a lower cover disposed on a side of the shaft arm opposite to the upper cover, wherein the upper cover and the lower cover are configured to move together along a first direction;
    a quick release plate used to install a load, disposed on a side of the upper cover away from the lower cover, and configured to move along a second direction on the upper cover, the lower cover and the quick release plate being located at opposite sides of the upper cover; and
    a locking assembly, passing through the lower cover and the upper cover, wherein, after the locking assembly is tightened, the upper cover and the lower cover are tightened and fixed on the shaft arm, and the quick release plate is locked to and fixed on the upper cover.

2. The locking device according to claim 1, further comprising:
    a press block, wherein the press block is disposed on the quick release plate and combined with the quick release plate, and is configured to press the quick release plate.

3. The locking device according to claim 2, wherein:
    the press block is disposed on a side of the upper cover away from the lower cover; and
    after the locking assembly is tightened, the press block presses the quick release plate against the upper cover, and presses the upper cover and the lower cover against the shaft arm.

4. The locking device according to claim 2, further comprising:
    an anti-off assembly, wherein the anti-off assembly comprises an anti-off screw, the anti-off screw passes through the upper cover and combines with the press block.

5. The locking device according to claim 4, wherein:
    the upper cover comprises an upper cover top surface;
    the upper cover top surface is provided with a receiving groove;
    a bottom of the receiving groove is provided with an upper cover step hole;
    the anti-off assembly further comprises a press block spring;
    the press block spring is disposed between the upper cover and the press block and received in the upper cover step hole; and
    the anti-off screw is disposed in the upper cover step hole and the press spring and combines with the press block.

6. The locking device according to claim 2, wherein:
    the locking assembly comprises a locking pillar and a handle disposed at one end of the locking pillar;

the locking pillar passes through the lower cover and the upper cover and combines with the press block; and the handle is disposed on a side of the lower cover away from the upper cover.

7. The locking device according to claim 1, wherein:
the upper cover comprises an upper cover bottom surface;
the upper cover bottom surface is provided with an upper cover mounting groove; and
the upper cover mounting groove is configured to receive a top wall of the shaft arm.

8. The locking device according to claim 7, wherein:
the upper cover mounting groove passes through two sides of the upper cover;
a cross-section of the upper cover mounting groove sectioned by a plane perpendicular to the first direction is a trapezoid; and
a bottom surface of the upper cover mounting groove and a sidewall surface of the upper cover mounting groove are configured to abut an external surface of the shaft arm.

9. The locking device according to claim 1, wherein:
the lower cover comprises a lower cover top surface;
the lower cover top surface is provided with a lower cover mounting groove; and
the lower cover mounting groove is configured to receive the bottom wall of the shaft arm.

10. The locking device according to claim 9, wherein:
the lower cover mounting groove passes through two sides of the lower cover;
a cross-section of the lower mounting groove sectioned by a plane perpendicular to the first direction is a trapezoid; and
the bottom surface of the lower cover mounting groove and the side surfaces of the lower cover mounting groove are all configured to abut the outer surface of the shaft arm.

11. The locking device according to claim 1, wherein:
the shaft arm is provided with a through groove;
the lower cover comprises a lower cover body and a lower cover hump disposed on the lower cover body;
the lower cover hump is received in the through groove; and
the locking assembly passes through the lower cover body, the lower cover hump and the upper cover.

12. The locking device according to claim 11, wherein:
the locking device further comprises a fixing assembly;
the fixing assembly comprises a fixing screw; and
the fixing screw passes through the lower cover body and the lower cover hump and combined with the upper cover.

13. The locking device according to claim 12, wherein:
the lower cover hump is provided with a lower cover step hole;
the fixing assembly further comprises a press spring;
the press spring is disposed between the lower cover hump and the upper cover and received in the lower cover step hole; and
the fixing screen passes through the lower cover step hole and the press spring and combined with the upper cover.

14. The locking device according to claim 11, wherein:
the lower cover hump is provided with a lower cover positioning hole;
the upper cover comprises an upper cover bottom surface;
the upper cover comprises an upper cover positioning pillar protruding from the upper cover bottom;
the upper cover positioning pillar passes through the lower cover positioning pillar; and/or
the lower cover further comprises a lower cover positioning pillar protruding from the lower cover hump;
the upper cover comprises an upper cover bottom surface;
the upper cover bottom surface is provided with an upper cover positioning hole; and
the lower cover positioning pillar passes through the upper cover positioning hole.

15. The locking device according to claim 11, wherein:
inner sidewalls of the through hole are provided with wave teeth;
the locking device further comprises a pre-tightened assembly;
the pre-tightened assembly comprises a pre-tightened block and a pre-tightened elastic member;
the pre-tightened elastic member is disposed between the pre-tightened block and the lower cover hump;
one end of the pre-tightened block abuts the wave teeth; and
another end of the pre-tightened block abuts the pre-tightened elastic member.

16. The locking device according to claim 1, wherein the quick release plate, the upper cover, the shaft arm, and the lower cover are disposed in sequence along a vertical direction.

17. A gimbal, comprising:
a shaft arm; and
a locking device disposed on the shaft arm, comprising:
an upper cover disposed on the shaft arm;
a lower cover disposed on a side of the shaft arm opposite to the upper cover, wherein the upper cover and the lower cover are configured to move together along a first direction;
a quick release plate used to install a load, disposed on a side of the upper cover away from the lower cover, and configured to move along a second direction on the upper cover; and
a locking assembly, passing through the lower cover and the upper cover, wherein, after the locking assembly is tightened, the upper cover and the lower cover are tightened and fixed on the shaft arm, and the quick release plate is locked to and fixed on the upper cover;
wherein:
a locking direction of the locking device is perpendicular to the first direction; and
the locking direction of the locking device is perpendicular to the second direction.

18. The gimbal according to claim 17, wherein:
the first direction and the second direction are perpendicular to each other.

19. The gimbal according to claim 17, wherein:
the first direction comprises an extending direction of the shaft arm.

20. A gimbal system, comprising:
an imaging device; and
a gimbal comprising:
a shaft arm; and
a locking device disposed on the shaft arm and comprising:
an upper cover disposed on the shaft arm;
a lower cover disposed on a side of the shaft arm opposite to the upper cover, wherein the upper cover and the lower cover are configured to move together along a first direction;

a quick release plate used to install a load, disposed on a side of the upper cover away from the lower cover, and configured to move along a second direction on the upper cover; and a locking assembly, passing through the lower cover and the upper cover, wherein, after the locking assembly is tightened, the upper cover and the lower cover are tightened and fixed on the shaft arm, and the quick release plate is locked to and fixed on the upper cover;

wherein:

the imaging device is disposed on the quick release plate; and the quick release plate, the upper cover, the shaft arm, and the lower cover are disposed in sequence along a vertical direction.

* * * * *